(12) United States Patent
Liou et al.

(10) Patent No.: US 11,705,026 B2
(45) Date of Patent: Jul. 18, 2023

(54) DISPLAY METHOD OF ELECTRONIC DEVICE

(71) Applicant: InnoLux Corporation, Miao-Li County (TW)

(72) Inventors: Hao-Yu Liou, Miao-Li County (TW); Ruey-Jer Weng, Miao-Li County (TW); Naoki Sumi, Miao-Li County (TW); Chih-Yung Hsieh, Miao-Li County (TW); Chung-Kuang Wei, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/838,254

(22) Filed: Jun. 12, 2022

(65) Prior Publication Data

US 2022/0309968 A1  Sep. 29, 2022

Related U.S. Application Data

(63) Continuation of application No. 17/495,829, filed on Oct. 7, 2021, now Pat. No. 11,393,368.

(60) Provisional application No. 63/109,873, filed on Nov. 5, 2020.

(30) Foreign Application Priority Data

Jun. 11, 2021  (CN) .......................... 202110657102.0

(51) Int. Cl.
*G09G 3/00* (2006.01)
*B60K 35/00* (2006.01)

(52) U.S. Cl.
CPC .............. *G09G 3/002* (2013.01); *B60K 35/00* (2013.01); *B60K 2370/1529* (2019.05); *G09G 2340/0464* (2013.01); *G09G 2380/10* (2013.01)

(58) Field of Classification Search
CPC ....................................................... G09G 3/002
See application file for complete search history.

(56) References Cited

U.S. PATENT DOCUMENTS

| 2020/0150431 A1* | 5/2020 | Kusafuka | G02B 30/22 |
| 2020/0301504 A1* | 9/2020 | Williams | G06T 11/60 |
| 2022/0197052 A1* | 6/2022 | Makinen | G02B 3/0037 |

* cited by examiner

*Primary Examiner* — Gustavo Polo
(74) *Attorney, Agent, or Firm* — Winston Hsu

(57) ABSTRACT

A display method of an electronic device includes following steps. Providing a first image by a display, and a first vergence plane of two eyes of a user is located at a first position when the user views the first image. Providing a second image by the display, and the first image, the second image and an environmental scene are located within a field of view of the user, and a second vergence plane of the two eyes of the user is located at a second position when the user views the second image. A first distance exists between the first position of the first vergence plane and the user, a second distance exists between the second position of the second vergence plane and the user, and the first distance is different from the second distance.

20 Claims, 10 Drawing Sheets

DISPLAY METHOD OF ELECTRONIC DEVICE

CROSS REFERENCE TO RELATED APPLICATIONS

This application is a continuation application of U.S. application Ser. No. 17/495,829, filed on Oct. 7, 2021, which claims the benefit of U.S. Provisional Application No. 63/109,873, filed on Nov. 5, 2020. The contents of these applications are incorporated herein by reference.

BACKGROUND OF THE DISCLOSURE

1. Field of the Disclosure

The present disclosure relates to a display method of an image and a display method of an electronic device, and more particularly to a display method of an image and a display method of an electronic device of the augmented reality technology.

2. Description of the Prior Art

The augmented reality (AR) display technology has been widely used in various fields. This technology can display images with the scenes in real environment. However, in current image display methods, the image and the scene of the real environment cannot be effectively superimposed when the user is viewing, resulting in blurred image or blurred scene of the real environment. Therefore, there is a need to provide an improved scheme for the display method of augmented reality.

SUMMARY OF THE DISCLOSURE

An embodiment of the present disclosure provides a display method of an electronic device including following steps. Providing a first image by a display, and a first vergence plane of two eyes of a user is located at a first position when the user views the first image. Providing a second image by the display, and the first image, the second image and an environmental scene are located within a field of view of the user, and a second vergence plane of the two eyes of the user is located at a second position when the user views the second image. A first distance exists between the first position of the first vergence plane and the user, a second distance exists between the second position of the second vergence plane and the user, and the first distance is different from the second distance.

An embodiment of the present disclosure provides a display method of an image, which comprises the following steps. Providing a display, the display provides a first image, and the first image and an environmental scene are located within a field of view of a user. A first vergence plane of two eyes of the user is located at a first position when the user views the first image, and a second vergence plane of the two eyes is located at a second position when the user views an object in the environmental scene. A first distance exists between the first position of the first vergence plane and the user, a second distance exists between the second position of the second vergence plane and the user, and the first distance and the second distance satisfy a first relation: $Dn<D1<Df$, wherein D1 represents the first distance, $Dn=D2+\Delta n$, and $Df=D2+\Delta f$, wherein D2 represents the second distance, $\Delta n=(De/2)*\{\tan[\tan^{-1}(2*D2/De)-\delta]\}-D2$, and $\Delta f=(De/2)*\{\tan[\tan^{-1}(2*D2/De)+\delta]\}-D2$, and wherein De represents a distance between the two eyes, δ represents an eye angular resolution of the two eyes, and δ=0.02 degrees.

These and other objectives of the present disclosure will no doubt become obvious to those of ordinary skill in the art after reading the following detailed description of the embodiment that is illustrated in the various figures and drawings.

DETAILED DESCRIPTION

Figure 1:
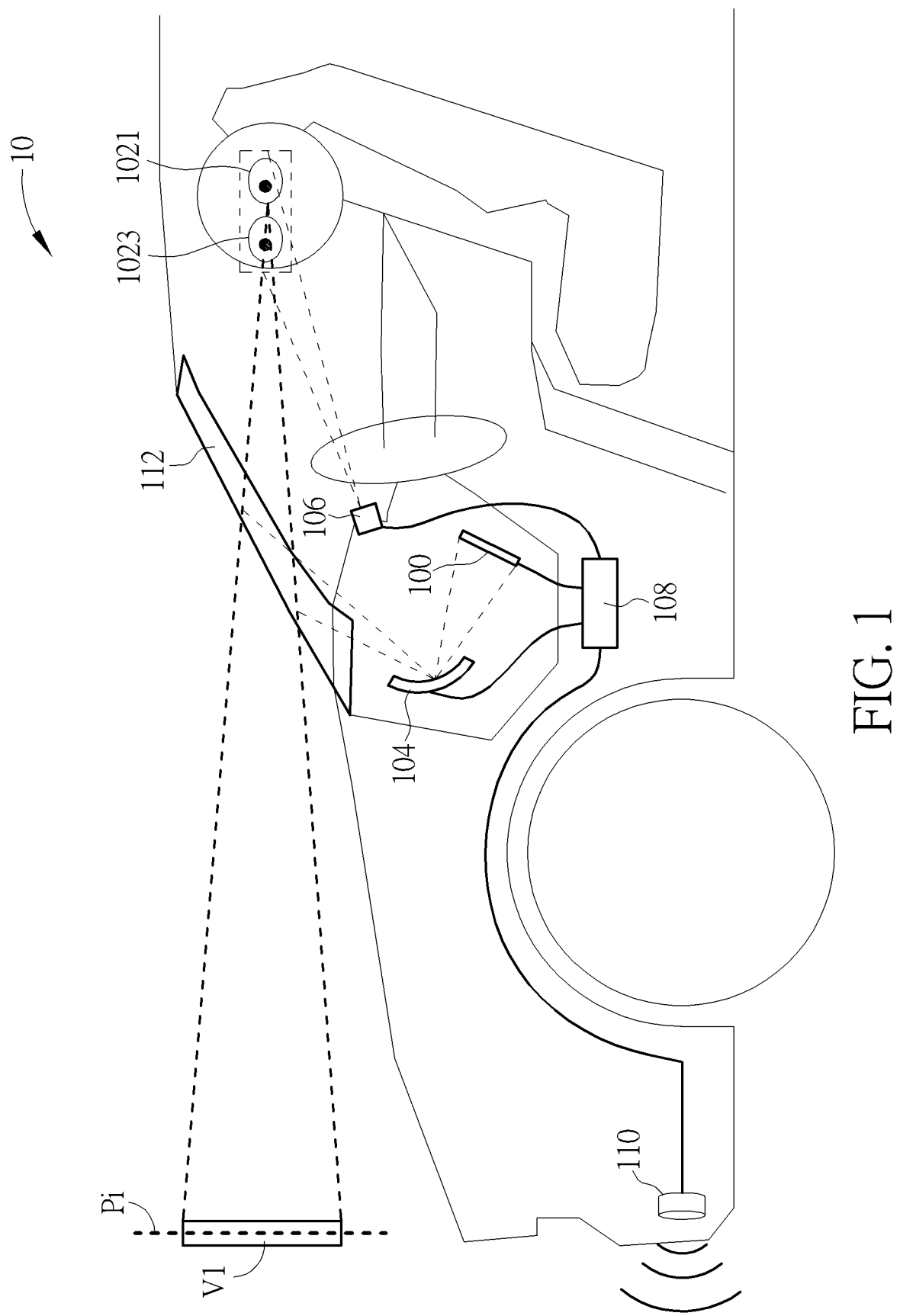
FIG. 1 is a schematic diagram of an electronic device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain components in various drawings may not be drawn to scale. In addition, the number and dimension of each element shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

In addition, when an element is referred to as being "directly on", "directly disposed on", "directly connected to", or "directly coupled to" another element or layer, there are no intervening elements or layers presented.

The electrical connection may be direct connection or indirect connection. When two elements are electrically connected, the electrical signals may be transmitted by direct contact, and there are no other elements presented between the two elements. When two elements are electrically connected, the electrical signals may be transmitted through the intermediate element bridging the two elements. The term "electrically connecting" may also be referred to as "coupling".

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

The electronic device of the present disclosure may include a display device, but not limited herein. The display device may include a touch display, a curved display or a free shape display, but not limited herein. The display device may be a bendable or flexible display device. The display device may include light-emitting diodes, liquid crystal, fluorescence, phosphors, other suitable display media or combinations of the above, but not limited herein. The light-emitting diodes may, for example, include organic light-emitting diodes (OLEDs), inorganic light-emitting diodes (LEDs), mini-light-emitting diodes (mini LEDs, millimeter sized LEDs), micro-light-emitting diodes (micro-LEDs, micrometer sized LEDs), quantum dots (QDs) light-emitting diodes (e.g. QLEDs or QDLEDs), other suitable light-emitting diodes or any combination of the above, but not limited herein. The concept or principle of the present disclosure may also be applied to non-self-emissive liquid crystal display (LCD), but not limited herein.

The display device may be any combination of the devices describe above, but not limited herein. In addition, the appearance of the display device may be rectangular, circular, polygonal, a shape with curved edges or other suitable shapes. The electronic device may have external systems such as a driving system, a control system, a light source system, a shelf system, etc. to support a display device.

Please refer to FIG. 1. FIG. 1 is a schematic diagram of an electronic device according to a first embodiment of the present disclosure. The electronic device 10 may be, for example, an augmented reality (AR) system or other types of three-dimensional image display systems, but not limited herein. For example, the electronic device 10 of this embodiment is applied to a vehicle as an example, but the application of the electronic device 10 of the present disclosure is not limited herein. In other embodiments, the augmented reality system may also be applied to glasses, but not limited herein.

As shown in FIG. 1, the electronic device 10 may include a display 100, an optical element 104 and a controller 108, but not limited herein. The electronic device 10 may also selectively include a sensing element 106 and a sensing element 110, but not limited herein. The controller 108 may be coupled to the display 100, the optical element 104, the sensing element 106 and the sensing element 110.

The display 100 may provide an image. The image may be projected onto a glass 112 (such as a windshield) through the optical element 104, the image may form an image V1 (also referred to as a first image) on a virtual image plane Pi outside the glass 112, and two eyes of a user (such as an eye 1021 and an eye 1023) may view the image V1 through the glass 112. Therefore, the image V1 outside the glass 112 and an environmental scene may be located within a field of view (FOV) of the user. In addition, the display 100 may provide a left-eye image for the eye 1021 and a right-eye image for the eye 1023, and an offset exists between the left-eye image and the right-eye image, so that the image V1 finally viewed by the user is a three-dimensional image, but not limited herein. In addition, the electronic device 10 of this embodiment may project single image V1 onto one virtual image plane Pi, but not limited herein.

Figure 2:
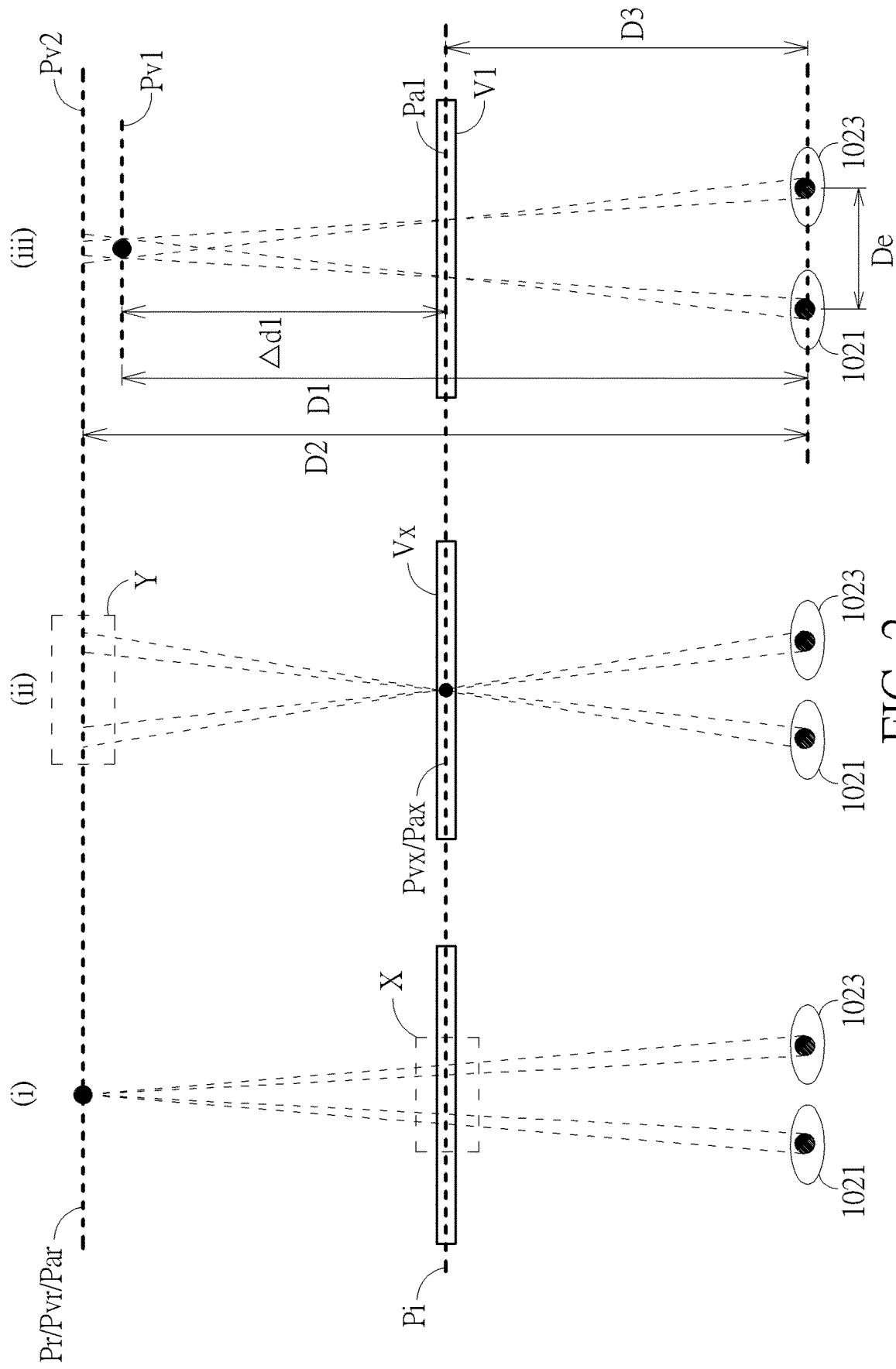
FIG. 2 is a schematic diagram of the comparison of different user viewing states.

Please refer to FIG. 2. FIG. 2 is a schematic diagram of the comparison of different user viewing states. An example (i) is a state that the user viewing one or more objects in the environmental scene, an example (ii) is a user viewing state of the conventional augmented reality system, and an example (iii) is a user viewing state using the display method of image of this embodiment. In FIG. 2, a first object (such as roads, pedestrians, etc.) in the environmental scene may be located on an image plane Pr, and the image generated by the augmented reality system may be located on a virtual image plane Pi. In the example (i), the sight lines of the two eyes (such as the eye 1021 and the eye 1023) converge on the image plane Pr, and one eye (such as the eye 1021 or the eye 1023) also focuses on the image plane Pr when the user views the first object in the environmental scene. In other words, in the example (i), the positions of the vergence plane Pvr of the two eyes, the accommodation plane Par of the single eye and the image plane Pr of the first object in the environmental scene are the same. However, in the example (i), as shown by a dashed frame X, the image of the display viewed by the user is blurred while the user is viewing the first object in the environmental scene.

In the example (ii), an image Vx provided by the conventional augmented reality system may be located on the virtual image plane Pi. The sight lines of the two eyes converge on the virtual image plane Pi, and the single eye also focuses on the virtual image plane Pi when the user views the image Vx. In other words, in the example (ii), the positions of the vergence plane Pvx of the two eyes, the accommodation plane Pax of the single eye and the virtual image plane Pi of the image Vx are the same. However, in the example (ii), as shown by a dashed frame Y, the first object in the environmental scene within the dashed frame Y viewed by the user is blurred while the user is viewing the image Vx.

However, when the image Vx provided by the augmented reality system is used to mark the first object in the environmental scene, due to the difference in the positions of the vergence planes of the two eyes, the user may not clearly view the image Vx of the augmented reality system and the first object in the environmental scene at the same time, or the user may feel uncomfortable. Therefore, in the display method of the image of the present disclosure, the drawbacks exist in the conventional augmented reality system may be lessened by adjusting the position of the vergence plane of the two eyes when the user views the augmented reality image V1.

As shown in the example (iii) of FIG. 2, in the display method of the image of this embodiment, a vergence plane Pv1 (also referred to as a first vergence plane) where the sight lines of the two eyes of the user converge may be located at a first position when the two eyes of the user views the image V1, and a distance D1 (also referred to as a first distance) exists between the first position of the vergence plane Pv1 and the user. Furthermore, a vergence plane Pv2

(also referred to as a second vergence plane) where the sight lines of the two eyes of the user converge may be located at a second position when the user views the first object in the environmental scene, and a distance D2 (also referred to as a first distance) exists between the second position of the vergence plane Pv2 and the user.

Figure 3:
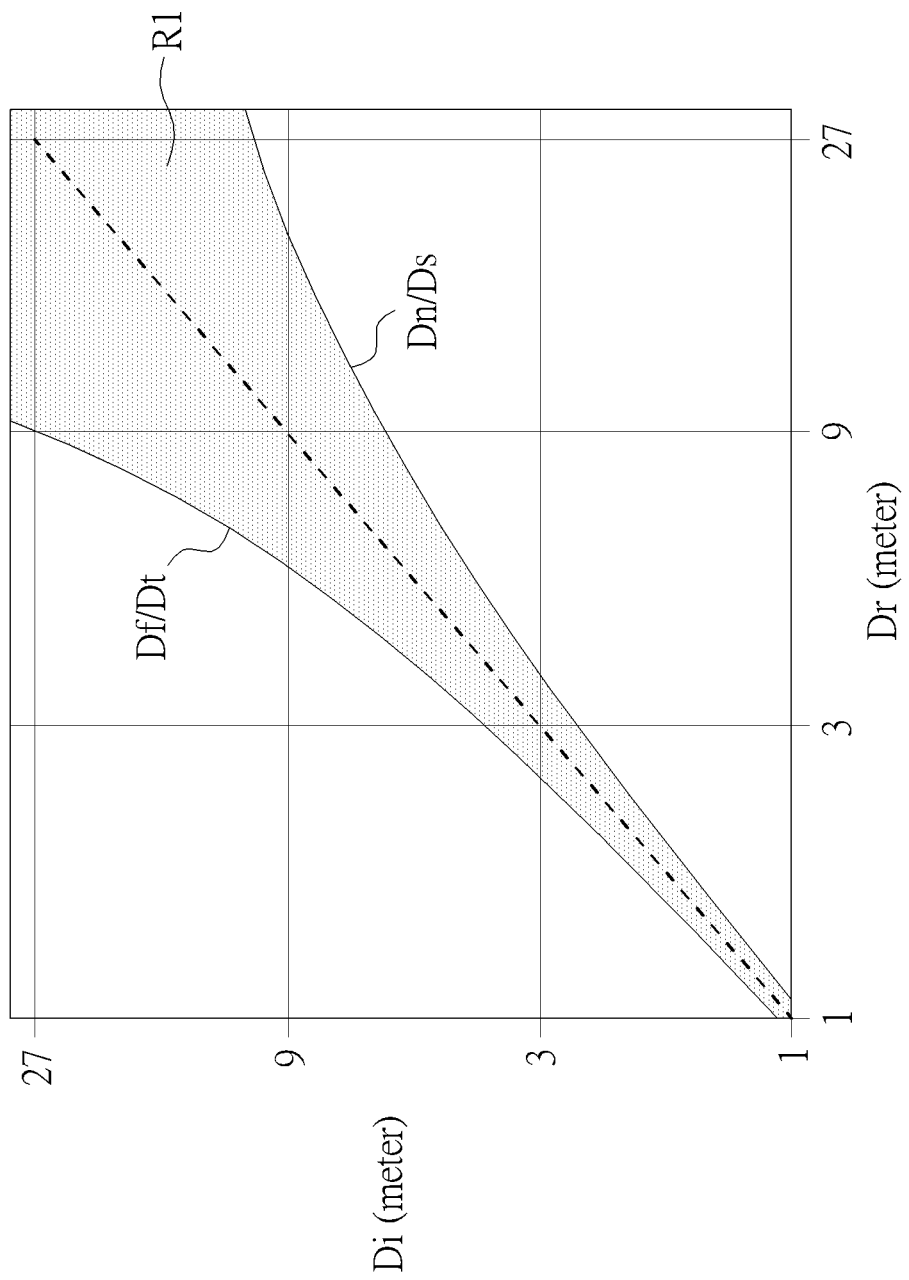
FIG. 3 is a schematic diagram of a relationship of positions of vergence planes of two eyes of a user viewing an image and an environmental scene.

In addition, please refer to FIG. 3. FIG. 3 is a schematic diagram of a relationship of positions of vergence planes of two eyes of a user viewing an image and an environmental scene. The distance Di in FIG. 3 may be the distance D1 between the vergence plane Pv1 of the two eyes and the user when the user views the image V1, and the distance Dr in FIG. 3 may be the distance D2 between the vergence plane Pv2 of the two eyes and the user when the user views the first object in the environmental scene. As shown in FIG. 3, the distance D1 and the distance Dr may have a range R1, and the distance D1 and the distance D2 may fall within the range R1. The user may clearly view the image V1 and the first object in the environmental scene at the same time, or may effectively reduce user's uncomfortable feeling when the distance D1 and the distance D2 fall within the range R1.

The distance D1 and the distance D2 may satisfy a first relation: Dn<D1<Df when the distance D1 and the distance D2 fall within the range R1. The lower limit distance Dn=D2+Δn, and the lower limit distance Dn (as shown in FIG. 3) may be the shortest distance Di that the user can clearly view the image V1 and the first object in the environmental scene at the same time. The upper limit distance Df=D2+Δf, and the upper limit distance Df (as shown in FIG. 3) may be the farthest distance Di that the user can clearly view the image V1 and the first object in the environmental scene at the same time. In addition, $\Delta n = (De/2)*\{\tan[\tan^{-1}(2*D2/De)-\delta]\}-D2$, and $\Delta f = (De/2)*\{\tan[\tan^{-1}(2*D2/De)+\delta]\}-D2$. Furthermore, De represents a distance between the two eyes (such as a distance De between the eye 1021 and the eye 1023 in FIG. 2), δ represents an eye angular resolution of the two eyes, and δ=0.02 degrees.

Figure 4:
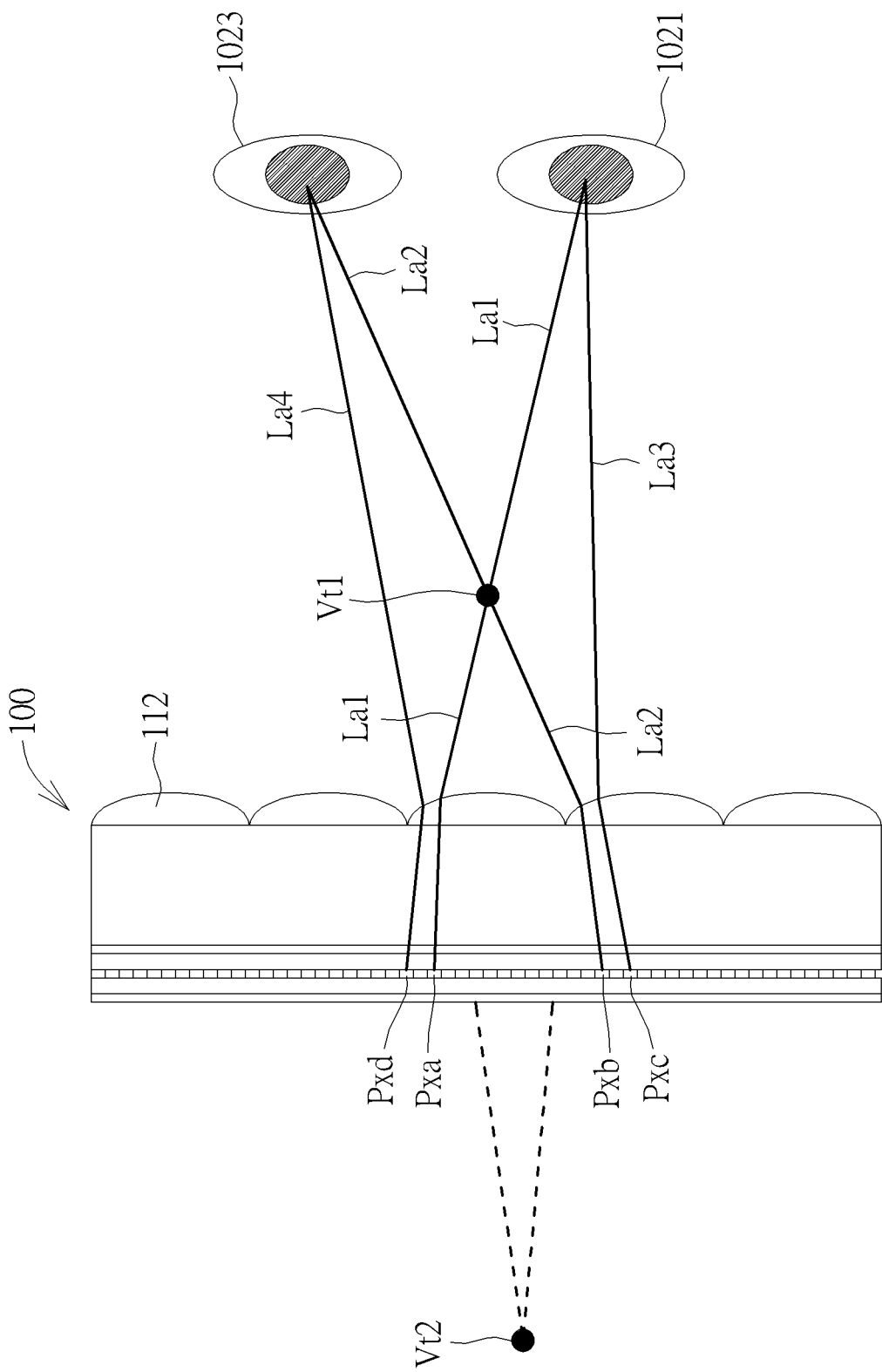
FIG. 4 is a schematic diagram of adjusting a position of a vergence plane of two eyes according to the present disclosure.

The method of adjusting the position of the vergence plane Pv1 of the two eyes when the user is viewing the augmented reality image V1 in the present disclosure will be described in the following. Please refer to FIG. 4. FIG. 4 is a schematic diagram of adjusting a position of a vergence plane of two eyes according to the present disclosure. In addition, in order to simplify the drawing, the optical element 104 and the glass 112 in FIG. 1 are omitted in FIG. 4.

In an example of FIG. 4, a sub-pixel Pxa of the display 100 may emit a light beam La1 to the eye 1021, a sub-pixel Pxb of the display 100 may emit a light beam La2 to the eye 1023, and the light beam La1 and the light beam La2 may intersect at a vergence point Vt1. Based on the above principle, each picture may be displayed by one or a plurality of corresponding sub-pixels, and different pictures may be displayed by different sub-pixels. The eye 1021 may view the picture represented by the light beam La1, and the eye 1023 may view the picture represented by the light beam La2. An offset may be included between the pictures represented by the light beam La1 and the light beam La2 through displaying the pictures represented by the light beam La1 and the light beam La2 by different sub-pixels, thereby converging the two eyes at the vergence point Vt1.

In another example of FIG. 4, a sub-pixel Pxc of the display 100 may emit a light beam La3 to the eye 1021, a sub-pixel Pxd of the display 100 may emit a light beam La4 to the eye 1023, and the light beam La3 and the light beam La4 may intersect at a vergence point Vt2. The eye 1021 may view the picture represented by the light beam La3, and the eye 1023 may view the picture represented by the light beam La4. An offset may be included between the pictures represented by the light beam La3 and the light beam La4 through displaying the pictures represented by the light beam La3 and the light beam La4 by different sub-pixels, thereby converging the two eyes at the vergence point Vt2, and the position of the vergence point Vt2 may be different from the position of the vergence point Vt1. Therefore, the position of the vergence plane of the two eyes may be adjusted through providing pictures to the eye 1021 and the eye 1023 by different sub-pixels.

Please refer to FIG. 2. In the conventional augmented reality system of the example (ii), the position of the vergence plane Pvx of the two eyes and the position of the image Vx are the same when the user views the image Vx. However, as shown in the example (iii) in FIG. 2, compared with the conventional augmented reality system, the first position of the vergence plane Pv1 may be different from a third position of the image V1 since the first position of the vergence plane Pv1 may be adjusted in the display method of the image of this embodiment.

On the other hand, as shown in the example (iii) in FIG. 2, in the display method of the image of this embodiment, one eye (such as the eye 1021 or the eye 1023) of the user may focus on an accommodation plane Pa1 (also referred to as a first accommodation plane) when the one eye of the user views the image V1, and a fourth position of the accommodation plane Pa1 is the same as the third position of the image V1, but not limited herein. In addition, a distance D3 (also referred to as a third distance) exists between the fourth position of the accommodation plane Pa1 and the user.

Figure 5:
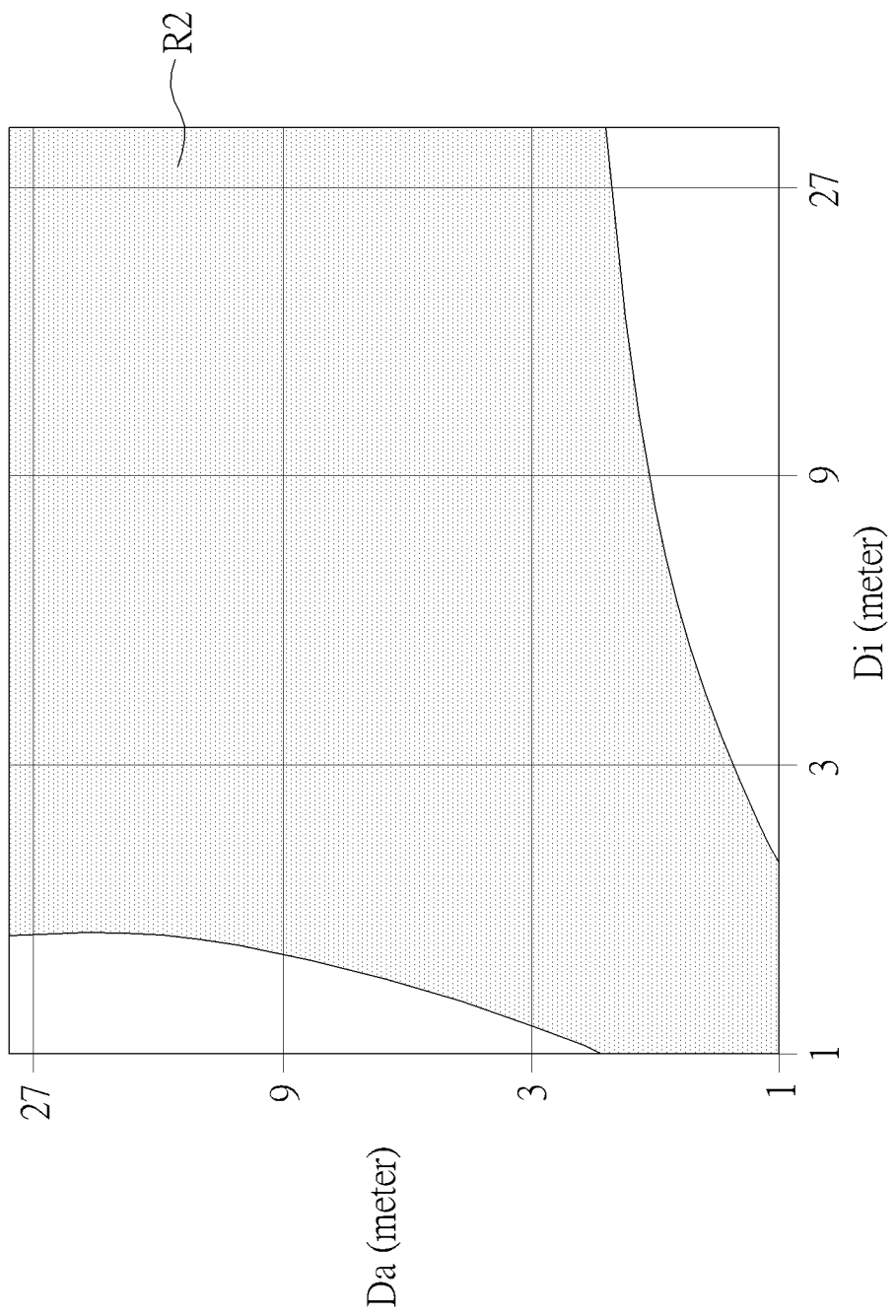
FIG. 5 is a schematic diagram of a relationship of positions of a vergence plane of two eyes and an accommodation plane of one eye when a user views an image.

Please refer to FIG. 5. FIG. 5 is a schematic diagram of a relationship of positions of a vergence plane of two eyes and an accommodation plane of one eye when a user views the image V1. The distance Di in FIG. 5 may be the distance D1 between the vergence plane Pv1 of the two eyes and the user when the user views the image V1, and the distance Da in FIG. 5 may be the distance D3 between the accommodation plane Pa1 of the one eye and the user when the user views the image V1. As shown in FIG. 5, the distance D1 and the distance Da may have a range R2, and the distance D1 and the distance D3 may fall within the range R2. The distance difference between the position of the accommodation plane Pa1 and the position of the vergence plane Pv1 may be reduced when the distance D1 and the distance D3 fall within the range R2, thereby reducing the discomfort of the user caused by the vergence-accommodation conflict.

When the distance D1 and the distance D3 fall within the range R2, the distance D1 and the distance D3 may satisfy a second relation as below:

$$D3+(D1/1.3052-0.2657*D1)<\Delta d1<D3-(D1/1.1286+0.442*D1)$$

A distance difference Δd1 exists between the distance D1 and the distance D3. The uncomfortable feeling of the user caused by the vergence-accommodation conflict may be mitigated when the distance difference Δd1 satisfies the second relation. In addition, in some embodiments, the second relation may be: $0 \leq \Delta d1 < D3-(D1/1.1286+0.442*D1)$.

The display 100 may include light emitting diodes, liquid crystal, fluorescence, phosphors, other suitable display media or combinations of the above, but not limited herein. The light emitting diodes may include, for example, organic light-emitting diodes (OLEDs), inorganic light-emitting diodes (LEDs), mini-light-emitting diodes (Mini LEDs), micro-light-emitting diodes (micro-LEDs), quantum dots (QDs) light-emitting diodes (such as QLEDs or QDLEDs), other suitable materials or any combinations of the above, but not limited herein. The display 100 may also be a bendable or flexible electronic device. In addition, as shown in FIG. 4, the surface of the display 100 may include a plurality of lenses 112, and the lenses 112 may have different shapes according to different optical requirements, but not limited herein.

The optical element 104 may include a mirror, a lens or combinations of the above, but not limited herein. The optical element 104 may include an image surface shift system, but not limited herein. The image surface shift system may include a projector system, a light filed technology element, a folding light path element, or combinations of the above, but note limited herein. The projection system may include a lens projector, a mirror or combinations of the above, but not limited herein. The light filed technology element may include a holographic optical element (HOE), an integral image element or combinations of the above, but not limited herein. The folding light path element may include a multi-mirror and space element, but not limited herein.

The glass 112 may include a windshield, but not limited herein. The glass 112 may be wedge type, flat type, curve type or combinations of the above, but not limited herein. A thin film may also be disposed on the glass 112, but not limited herein.

The sensing element 106 may include an eye tracking sensor, a head tracking sensor, a feature tracking sensor or combinations of the above, but not limited herein.

The sensing element 110 may include an environment sensor, but not limited herein. The sensing element 110 may include a camera, a light field camera, a structure light camera, a feature detector, a lidar, a radar or combinations of the above, but not limited herein.

The controller 108 may include programmable programming to execute algorithm processing, which may include, for example, a central processing unit (CPU), a system on chip (SoC), an application specific integrated circuit (ASIC), etc., but not limited herein. For example, the controller 108 may receive the information obtained by the sensing element 106 and the sensing element 110, such as the street views, pedestrians, the eye information of the user, etc. Based on this information, the controller 108 may obtain the image information for the display 100 through the algorithm calculation. The controller 108 may transmit the display data including the image information to the display 100, and the display 100 may provide the image V1 according to the display data, thereby realizing the display method of the image of the present disclosure.

Other embodiments of the present disclosure will be disclosed in the following. In order to simplify the illustration, the same elements in the following would be labeled with the same symbol. For clearly showing the differences between various embodiments, the differences between different embodiments are described in detail below, and repeated features will not be described redundantly. In addition, theses repeated features may be applied in various embodiments in the following.

Figure 6:
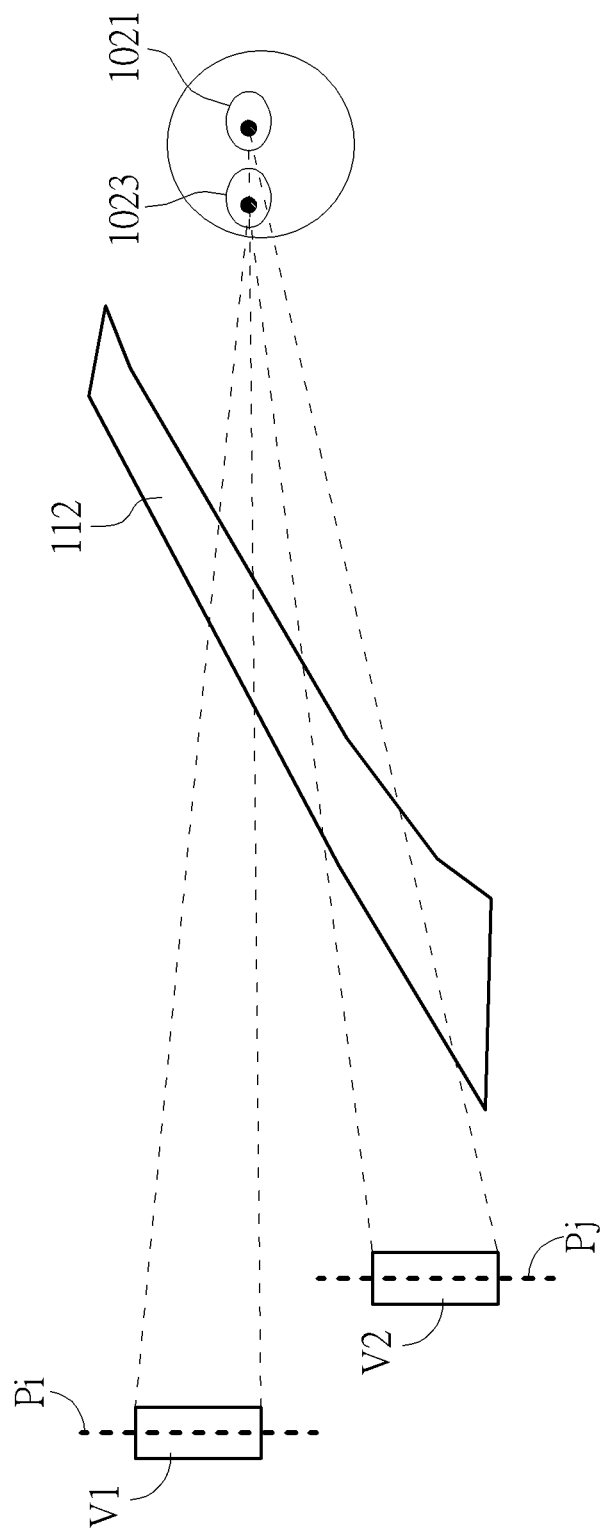
FIG. 6 is a schematic diagram of a user viewing an image according to a second embodiment of the present disclosure.
Figure 7:
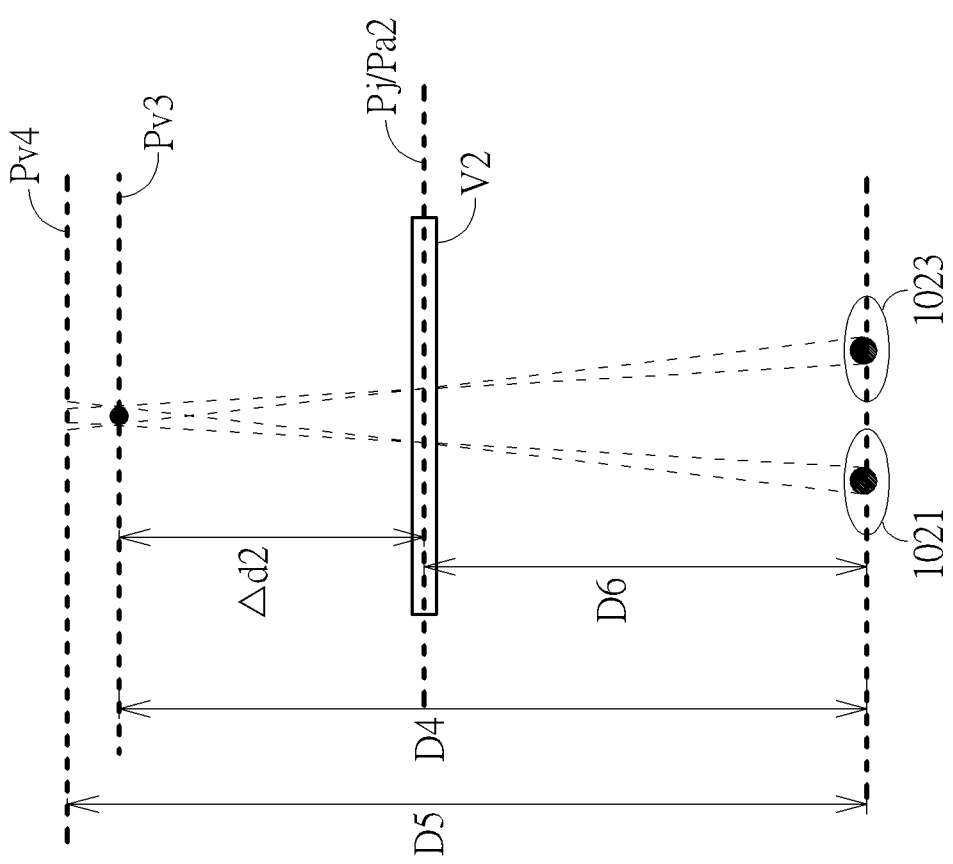
FIG. 7 is a schematic diagram of a user viewing state according to the second embodiment of the present disclosure.

Please refer to FIG. 6 and FIG. 7. FIG. 6 is a schematic diagram of a user viewing an image according to a second embodiment of the present disclosure. FIG. 7 is a schematic diagram of a user viewing state according to the second embodiment of the present disclosure. In some embodiments, the display 100 of the electronic device 10 may provide a plurality of images. As shown in FIG. 6, the display 100 may also provide an image V2 (also referred to as a second image) in addition to the image V1, and the image V2 may be located on a virtual image plane Pj. The position of the virtual image plane Pj may be different from the position of the virtual image plane Pi, so the position of the image V2 may be different from the position of the image V1. The two eyes of the user may view the image V2 through the glass 112, and the image V2 and the environmental scene may exist within the field of view of the user.

As shown in FIG. 7, a vergence plane Pv3 (also referred to as a third vergence plane) of the two eyes of the user is located at a fifth position when the user views the image V2, and the fifth position of the vergence plane Pv3 is different from the first position of the vergence plane Pv1 (as shown in FIG. 2). A vergence plane Pv4 (also referred to as a fourth vergence plane) of the two eyes is located at a sixth position when the user views a second object in the environmental scene. The positions of the first object and the second object in the environmental scene may be different, and the sixth position of the vergence plane Pv4 in FIG. 7 is different from the second position of the vergence plane Pv2 in FIG. 2. In addition, a distance D4 (also referred to as a fourth distance) exists between the fifth position of the vergence plane Pv3 and the user, and a distance D5 (also referred to as a fifth distance) exists between the sixth position of the vergence plane Pv4 and the user.

For making the user clearly view the image V2 and the second object in the environmental scene at the same time, or for effectively reducing user's uncomfortable feeling, the distance D4 and the distance D5 may also fall within the range R1 in FIG. 3. In this condition, the distance Di in FIG. 3 may be the distance D4 between the vergence plane Pv3 of the two eyes and the user when the user views the image V2, and the distance Dr in FIG. 3 may be the distance D5 between the vergence plane Pv4 of the two eyes and the user when the user views the second object in the environmental scene. The distance D4 and the distance D5 may satisfy a third relation: Ds<D4<Dt when the distance D4 and the distance D5 fall within the range R1 of FIG. 3.

In the third relation, The lower limit distance Ds=D5+Δs, and the lower limit distance Ds (as shown in FIG. 3) may be the shortest distance Di that the user can clearly view the image V2 and the second object in the environmental scene at the same time. The upper limit distance Dt=D5+Δt, and the upper limit distance Dt (as shown in FIG. 3) may be the farthest distance Di that the user can clearly view the image V2 and the second object in the environmental scene at the same time. In addition, $\Delta s=(De/2)*\{\tan[\tan^{-1}(2*D5/De)-\delta]\}-D5$, and $\Delta t=(De/2)*\{\tan[\tan^{-1}(2*D5/De)+\delta]\}-D5$. Furthermore, De represents a distance between the two eyes (such as a distance De between the eye 1021 and the eye 1023 in FIG. 2), δ represents an eye angular resolution of the two eyes, and δ=0.02 degrees.

Therefore, when the environmental scene includes the first object and the second object, and the distance between the first object and the user is different from the distance between the second object and the user, the electronic device 10 may provide the image V1 corresponding to the first object and the image V2 corresponding to the second object. In addition, the user may clearly view the image V1 and the first object in the environmental scene at the same time, or clearly view the image V2 and the second object in the environmental scene at the same time by adjusting the positions of the vergence planes of the two eyes when the user is viewing the augmented reality image V1 and the augmented reality image V2 through the display method of the image of this embodiment.

On the other hand, one eye (such as the eye 1021 or the eye 1023) of the user focuses on an accommodation plane Pa2 (also referred to as a second accommodation plane) when the one eye of the user views the image V2, and a seventh position of the accommodation plane Pa2 is the same as the position of the image V2. Since the position of the image V2 is different from the position of the image V1 (as shown in FIG. 6), the seventh position of the accommodation plane Pa2 (as shown in FIG. 7) is also different from the fourth position of the accommodation plane Pa1 (as shown in FIG. 2). In addition, a distance D6 (also referred to as a sixth distance) exists between the seventh position of the accommodation plane Pa2 and the user.

For mitigating the discomfort of the user caused by the vergence-accommodation conflict, the distance D4 and the distance D6 may also fall within the range R2 in FIG. 5. In this condition, the distance Di in FIG. 5 may be the distance D4 between the vergence plane Pv3 of the two eyes and the user when the user views the image V2, and the distance Da in FIG. 5 may be the distance D6 between the accommodation plane Pa2 of the one eye and the user when the user views the image V2. When the distance D4 and the distance D6 fall within the range R2 of FIG. 5, the distance D4 and the distance D6 may satisfy a fourth relation as below:

$$D6+(D4/1.3052-0.2657*D4)<\Delta d2<D6-(D4/1.1286+0.442*D4)$$

A distance difference $\Delta d2$ exists between the distance D4 and the distance D6. In addition, in some embodiments, the fourth relation may be: $0\leq\Delta d2<D6-(D4/1.1286+0.442*D4)$.

In some embodiments, the image V1 and the imager V2 may be displayed by different regions of the display 100. As shown in FIG. 4, the image V1 and the image V2 may be displayed by sub-pixels in different regions of the display 100, so that the user may have different vergence planes (such as the vergence point Vt1 and the vergence point Vt2) when the user views the image V1 and the image V2, but limited herein. In some embodiments, the display 100 may provide the image V1 at a first time point and the image V2 at a second time point, and the first time point is different from the second time point, but not limited herein. The method described above may make the positions of the vergence planes of the two eyes the user different when the user views the image V1 and the image V2, or make the positions of the accommodation planes of the one eye of the user different when the user views the image V1 and the V2, and the method of adjusting the positions of the accommodation planes may be referred to the subsequent FIG. 10.

Figure 8:
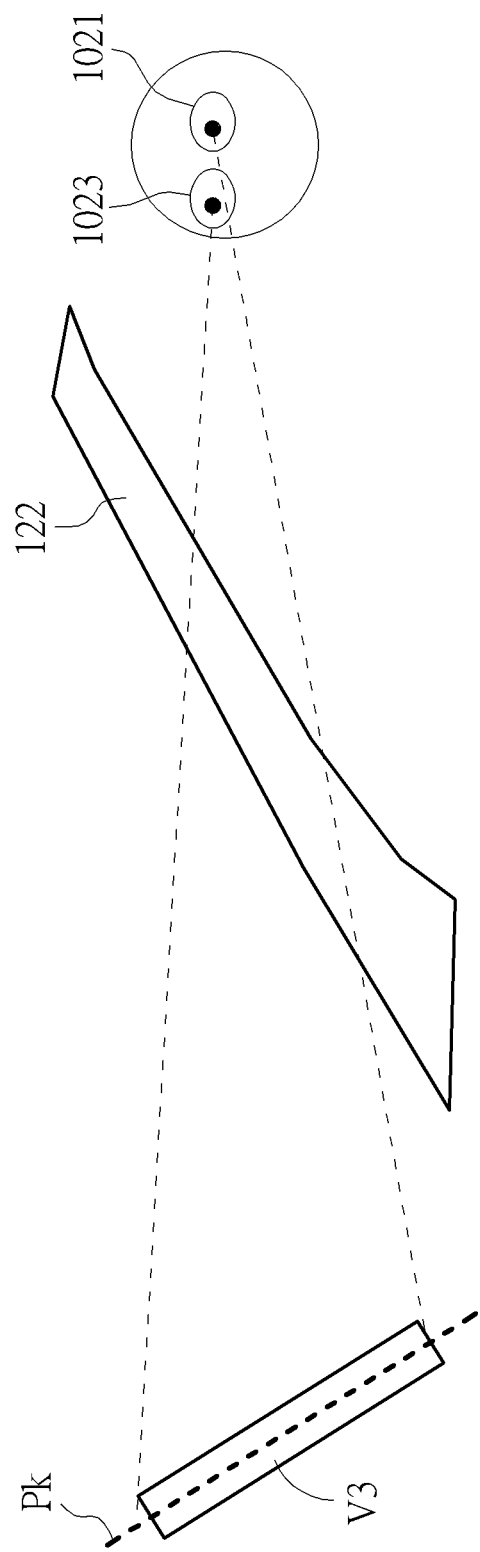
FIG. 8 is a schematic diagram of a user viewing an image according to a third embodiment of the present disclosure.

Please refer to FIG. 8. FIG. 8 is a schematic diagram of a user viewing an image according to a third embodiment of the present disclosure. In some embodiments (as shown in FIG. 8), the display 100 of the electronic device 10 may provide an image V3, the image V3 may be located on a virtual image plane Pk, and the distances between the user and different portions of the image V3 or different portions of the virtual image plane Pk may be different. For example, the image V3 may include different image contents displayed by different regions (or sub-pixels) of the display 100, and the user may have vergence planes of the two eyes or the accommodation planes of the one eye at different distances when the user views these different image contents, but not limited herein. In addition, the vergence planes of the two eyes and different objects in the environmental scene may satisfy the range R1 in FIG. 3, or the vergence planes of the two eyes and the accommodation planes of the one eye may satisfy the range R2 in FIG. 5. Therefore, the user may clearly view different image contents and different objects in the environmental scene at the same time, or the discomfort of the user caused by the vergence-accommodation conflict may be mitigated.

Figure 9:
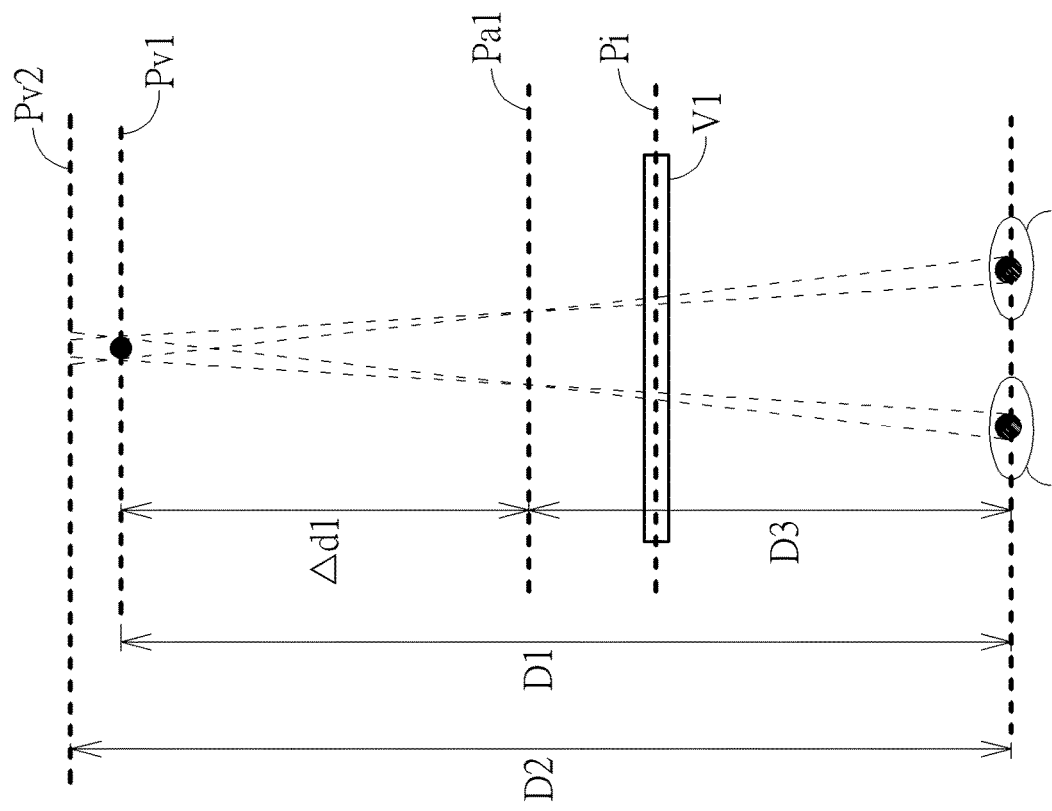
FIG. 9 is a schematic diagram of a user viewing state according to a fourth embodiment of the present disclosure.

Please refer to FIG. 9. FIG. 9 is a schematic diagram of a user viewing state according to a fourth embodiment of the present disclosure. In some embodiments, the position of the accommodation plane Pa1 may be further adjusted in the display method of the image when the distance D1 between the vergence plane Pv1 of the two eyes and the user and the distance D3 between the accommodation plane Pa1 of the one eye and the user fall outside the range R2 in FIG. 5, or when the distance difference between the position of the accommodation plane Pa1 and the position of the vergence plane Pv1 needs to be reduced to further mitigate the discomfort of the user caused by the visual vergence-accommodation conflict.

Different from the first embodiment (as shown in the example (iii) of FIG. 2), in this embodiment (as shown in FIG. 9), one eye (such as the eye 1021 or the eye 1023) of the user focuses on the accommodation plane Pa1 when the one eye of the user views the image V1, the fourth position of the accommodation plane Pa1 may be different from the third position of the image V1, and the fourth position of the accommodation plane Pa1 may also be different from the first position of the vergence plane Pv1. Therefore, the fourth position of the accommodation plane Pa1 may be closer to the first position of the vergence plane Pv1, and the distance difference $\Delta d1$ between the distance D1 and the distance D3 may be further reduced.

Figure 10:
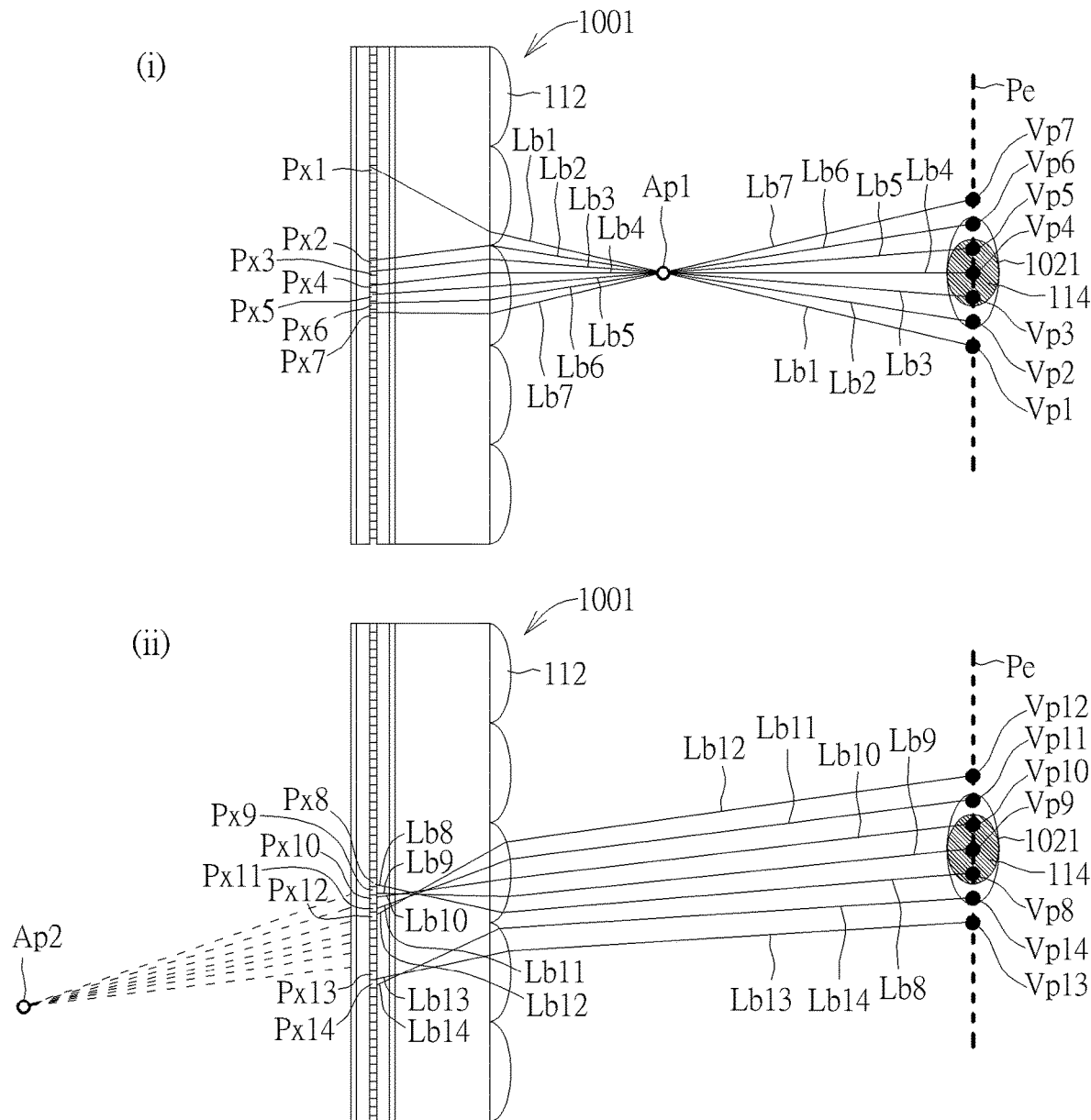
FIG. 10 is a schematic diagram of adjusting a position of an accommodation plane of one eye according to the present disclosure.

The method of adjusting the accommodation position of one eye in this embodiment will be described in the following. Please refer to FIG. 10. FIG. 10 is a schematic diagram of adjusting a position of an accommodation plane of one eye according to the present disclosure. The eye 1021 is used as an example in FIG. 10, but this method may also be applied to the eye 1023. In addition, in order to simplify the drawing, the optical element 104 and the glass 112 in FIG. 1 are omitted in FIG. 10.

In the example (i) of FIG. 10, a sub-pixel Px1, a sub-pixel Px2, a sub-pixel Px3, a sub-pixel Px4, a sub-pixel Px5, a sub-pixel Px6 and a sub-pixel Px7 of the display 100 may respectively emit a light beam Lb1, a light beam Lb2, a light beam Lb3, a light beam Lb4, a light beam Lb5, a light beam Lb6 and a light beam Lb7 to a view point VP1, a view point Vp2, a view point Vp3, a view point Vp4, a view point Vp5, a view point Vp6 and a view point Vp7 on a plane Pe where the eye 1021 is located. The light beam Lb1, the light beam Lb2, the light beam Lb3, the light beam Lb4, the light beam Lb5, the light beam Lb6 and the light beam Lb7 may focus on an accommodation point Ap1.

Furthermore, the light beam Lb3, the light beam Lb4 and the light beam Lb5 emitted by the sub-pixel Px3, the sub-pixel Px4 and the sub-pixel Px5 may enter a pupil 114 of the eye 1021 in different view directions. In other words, the eye 1021 may view the light beam Lb3, the light beam Lb4 and the light beam Lb5 emitted by different sub-pixels at the same time. Based on the above principle, each light beam may respectively represent a picture, each picture may be displayed by one or a plurality of corresponding sub-pixels, and different pictures may be displayed by different sub-pixels. For example, an image provided by the display 100 may include the pictures represented by the light beam Lb1 to the light beam Lb7 at the same time, and the eye 1021 may view the pictures represented by the light beam Lb3, the light beam Lb4 and the light beam Lb5 at the same time. Offsets included between the pictures represented by the light beam Lb3, the light beam Lb4 and the light beam Lb5 in the same image may be generated by displaying the pictures represented by the light beam Lb3, the light beam Lb4 and the light beam Lb5 by different sub-pixels, thereby making the eye 1021 focus on the accommodation point Ap1.

In the example (ii) of FIG. 10, a sub-pixel Px8, a sub-pixel Px9, a sub-pixel Px10, a sub-pixel Px11, a sub-pixel Px12, a sub-pixel Px13 and a sub-pixel Px14 of the display 100 may respectively emit a light beam Lb8, a light beam Lb9, a light beam Lb10, a light beam Lb11, a light beam Lb12, a light beam Lb13 and a light beam Lb14 to a view point VP8, a view point Vp9, a view point Vp10, a view point Vp11, a view point Vp12, a view point Vp13 and a view point Vp14 on a plane Pe where the eye 1021 is located. The light beam Lb8, the light beam Lb9, the light beam Lb10, the light beam Lb11, the light beam Lb12, the light beam Lb13 and the light beam Lb14 may focus on another accommodation point Ap2, and the position of the accommodation point Ap2 is different from the position of the accommodation point Ap1.

Furthermore, the light beam Lb8, the light beam Lb9 and the light beam Lb10 emitted by the sub-pixel Px8, the sub-pixel Px9 and the sub-pixel Px10 may enter the pupil 114 of the eye 1021 in different view directions. In other words, the eye 1021 may view the light beam Lb8, the light beam Lb9 and the light beam Lb10 emitted by different sub-pixels at the same time. For example, an image provided by the display 100 may include the pictures represented by the light beam Lb8 to the light beam Lb14 at the same time, and the eye 1021 may view the pictures represented by the light beam Lb8, the light beam Lb9 and the light beam Lb10 at the same time. Offsets included between the pictures represented by the light beam Lb8, the light beam Lb9 and the light beam Lb10 in the same image may be generated by displaying the pictures represented by the light beam Lb8, the light beam Lb9 and the light beam Lb10 by different sub-pixels, thereby making the eye 1021 focus on the accommodation point Ap2.

As shown in FIG. 10, the images provided by the display 100 may have different offsets through displaying different images (such as the images including the light beams Lb1-Lb7 and the images including the light beams Lb8-Lb14) by different sub-pixels (such as the sub-pixels Px1-Px7 and the sub-pixels Px8-Px14), such that the fourth position of the accommodation plane Pa1 of the one eye in FIG. 9 may be adjusted. For example, the controller 108 may obtain the image information (such as the information regarding offsets) for the display 100 through the algorithm calculation. The controller 108 may transmit the display data including the image information to the display 100, and the display 100 may provide the image V1 according to the display data, thereby realizing the display method of adjusting the accommodation plane of the one eye.

In addition, taking FIG. 10 as an example, the view point Vp1, the view point Vp2, the view point Vp6 and the view point Vp7 (or the view point Vp11, the view point Vp12, the view point Vp13 and the view point Vp14) are located outside the pupil 114, and these view points (or the pictures corresponding to these view points) make the eye 1021 able to view the image while moving, that is to say, these view points increase the dimension of the moving range of the eyes.

In the display method of the image of the present disclosure, the position of the vergence plane of the two eyes may be different from the position of the image by adjusting the position of the vergence plane. The first distance exists between the vergence plane of two eyes of the user and the user, and the third distance exists between the accommodation plane of one eye and the user when the user views the augmented reality image. The second distance exists between the vergence plane of two eyes and the user when the user views the object in the environmental scene. The user may clearly view the augmented reality image and the object in the environmental scene at the same time, or user's uncomfortable feeling may be effectively reduced by controlling the first distance and the second distance within the range R1 of FIG. 3. In addition, the uncomfortable feeling of the user caused by the visual vergence-accommodation conflict may be mitigated through controlling the first distance and the third distance within the range R2 of FIG. 5.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display method of an electronic device, comprising:
providing a first image by a display, wherein a first vergence plane of two eyes of a user is located at a first position when the user views the first image; and
providing a second image by the display, wherein the first image, the second image and an environmental scene are located within a field of view of the user, and a second vergence plane of the two eyes of the user is located at a second position when the user views the second image,
wherein a first distance exists between the first position of the first vergence plane and the user, a second distance exists between the second position of the second vergence plane and the user, and the first distance is different from the second distance,
wherein one of the two eyes of the user focuses on a first accommodation plane when the one of the two eyes of the user views the first image, and a position of the first accommodation plane is different from the first position of the first vergence plane.

2. The display method of the electronic device according to claim 1, wherein the display provides the first image at a first time point and the second image at a second time point, and the first time point is different from the second time point.

3. The display method of the electronic device according to claim 2, wherein the one of the two eyes of the user focuses on a second accommodation plane when the one of the two eyes of the user views the second image, and the position of the first accommodation plane is different from a position of the second accommodation plane.

4. The display method of the electronic device according to claim 1, the first distance is greater than the second distance.

5. The display method of the electronic device according to claim 4, wherein a third vergence plane of the two eyes is located at a third position when the user views an object in the environmental scene,
wherein a third distance exists between the third position of the third vergence plane and the user, and the first distance and the third distance satisfy a first relation:

$$Dn<D1<Df,$$

wherein D1 represents the first distance, $Dn=D3+\Delta n$, and $Df=D3+\Delta f$, wherein D3 represents the third distance, $\Delta n=(De/2)*\{\tan[\tan^{-1}(2*D3/De)-\delta]\}-D3$, and $\Delta f=(De/2)*\{\tan[\tan^{-1}(2*D3/De)+\delta]\}-D3$, and wherein De represents a distance between the two eyes, δ represents an eye angular resolution of the two eyes, and δ=0.02 degrees.

6. The display method of the electronic device according to claim 1, wherein the display comprises a liquid crystal.

7. The display method of the electronic device according to claim 1, wherein the display comprises a light emitting diode.

8. The display method of the electronic device according to claim 1, wherein the electronic device is applied to a vehicle.

9. The display method of the electronic device according to claim 1, further comprising providing a glass, wherein the glass is disposed between the user and the environmental scene.

10. The display method of the electronic device according to claim 9, wherein the glass comprises a windshield.

11. The display method of the electronic device according to claim 9, wherein the first image and the second image are projected onto the glass.

12. The display method of the electronic device according to claim 11, wherein the electronic device comprises an optical element, and the first image and the second image are projected onto the glass through the optical element.

13. The display method of the electronic device according to claim 12, wherein the optical element comprises a mirror or a lens.

14. The display method of the electronic device according to claim 1, wherein the electronic device comprises a first sensing element.

15. The display method of the electronic device according to claim 14, wherein the first sensing element comprises an eye tracking sensor, a head tracking sensor or a feature tracking sensor.

16. The display method of the electronic device according to claim 14, wherein the electronic device further comprises a second sensing element.

17. The display method of the electronic device according to claim 16, wherein the second sensing element comprises a camera, a light field camera, a structure light camera, a feature detector or a lidar.

18. A display method of an electronic device, comprising:

providing a first image by a display, wherein a first vergence plane of two eyes of a user is located at a first position when the user views the first image; and providing a second image by the display, wherein the first image, the second image and an environmental scene are located within a field of view of the user, and a second vergence plane of the two eyes of the user is located at a second position when the user views the second image, wherein a first distance exists between the first position of the first vergence plane and the user, a second distance exists between the second position of the second vergence plane and the user, and the first distance is different from the second distance, wherein the first image and the second image are displayed by different regions of the display, wherein one of the two eyes of the user focuses on a first accommodation plane when the one of the two eyes of the user views the first image, the one of the two eyes of the user focuses on a second accommodation plane when the one of the two eyes of the user views the second image, and a position of the first accommodation plane is different from a position of the second accommodation plane.

19. The display method of the electronic device according to claim 18, further comprising providing a glass, wherein the glass is disposed between the user and the environmental scene.

20. The display method of the electronic device according to claim 18, wherein the electronic device comprises a first sensing element.

* * * * *